(12) United States Patent
Chao et al.

(10) Patent No.: US 9,694,917 B1
(45) Date of Patent: Jul. 4, 2017

(54) DEPLOYMENT AND CONTROL ALGORITHMS FOR WHEEL CLUSTER FORMATIONS OF SATELLITES

(71) Applicant: The Aerospace Corporation, El Segundo, CA (US)

(72) Inventors: Chia-Chun Chao, Rolling Hills Estates, CA (US); Brian E. Kirkpatrick, El Segundo, CA (US); Victor Shiaw-Jong Lin, Oak Park, CA (US); Siegfried W. Janson, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/183,384

(22) Filed: Jun. 15, 2016

(51) Int. Cl.
  *B64G 1/10* (2006.01)
  *B64G 1/24* (2006.01)
  *B64G 1/26* (2006.01)
  *B64G 1/40* (2006.01)
  *B64G 3/00* (2006.01)

(52) U.S. Cl.
  CPC ............ *B64G 1/1085* (2013.01); *B64G 1/242* (2013.01); *B64G 1/26* (2013.01); *B64G 1/405* (2013.01); *B64G 3/00* (2013.01)

(58) Field of Classification Search
  CPC ........ B64G 1/1085; B64G 1/242; B64G 3/00; G05D 1/0883
  See application file for complete search history.

(56) References Cited

U.S. PATENT DOCUMENTS

| | | | |
|---|---|---|---|
| 5,199,672 A | * | 4/1993 | King ............... B64G 1/007 244/164 |
| 6,725,012 B1 | | 4/2004 | Janson et al. |
| 7,689,358 B2 | * | 3/2010 | Jaeger ............ B64G 1/1085 701/531 |
| 8,016,240 B2 | * | 9/2011 | Caplin ............ B64G 1/1085 244/158.5 |
| 8,511,617 B2 | * | 8/2013 | Caplin ............ B64G 1/1085 244/158.1 |
| 9,321,544 B2 | * | 4/2016 | Thompson ..... B64G 1/1085 |
| 2007/0250267 A1 | * | 10/2007 | Jaeger ............ B64G 1/1085 701/531 |
| 2008/0237399 A1 | * | 10/2008 | Caplin ............ B64G 1/1085 244/158.4 |
| 2009/0224105 A1 | * | 9/2009 | Caplin ............ B64G 1/1085 244/158.4 |
| 2014/0027576 A1 | * | 1/2014 | Boshuizen ...... B64G 1/1085 244/158.6 |
| 2016/0009425 A1 | * | 1/2016 | Thompson ..... B64G 1/1085 244/158.5 |

OTHER PUBLICATIONS

Brian Kirkpatrick et al., "Orbit Design for Clustered Satellites", published by The Aerospace Corporation ATM in Jun. 18, 2015.
(Continued)

*Primary Examiner* — Philip J Bonzell
(74) *Attorney, Agent, or Firm* — LeonardPatel PC

(57) ABSTRACT

A deployment algorithm that populate a group of companion satellites around a center satellite, and a control algorithm for maintaining the companion satellites in close formation around the center satellite.

12 Claims, 10 Drawing Sheets

::::

(56) References Cited

OTHER PUBLICATIONS

Chia-Chun Chao, "Applied Orbit Perturbation and Maintenance", Chapter 7, Section 7.3.1 and Chapter 8, Section 8.2.3, published by The Aerospace Press and AIAA Inc. in 2005.
Janson Schmidt, "Satellite Cluster Flight Design Considerations" published during the International Symposium on Space Flight Dynamics in Laurel Maryland on May 2014.
O. Brown et al., "Fractionated Space Architectures: A Vision for Responsive Space" published by Tech. Rep. DTIC in 2006.
S. Hur-Diaz et al., "Cluster Flight Application on System F6", during the 24th International Symposium on Space Flight Dynamics in Laurel, Maryland in 2014.

* cited by examiner

US 9,694,917 B1

DEPLOYMENT AND CONTROL ALGORITHMS FOR WHEEL CLUSTER FORMATIONS OF SATELLITES

STATEMENT OF GOVERNMENT INTEREST

This invention was made with government support under Contract No. FA8802-09-C-0001 awarded by the Department of the Air Force. The government has certain rights in the invention.

FIELD

The present invention relates to wheel cluster formations, and more particularly, to deployment and control algorithms for satellites in wheel cluster formations.

BACKGROUND

Orbital mechanics of formation flying includes a free flying sparse aperture array. This free flying sparse aperture array includes independent sub-satellites that orbit around a central host spacecraft at nearly constant range to provide an almost constant geometrical configuration with respect to the central host spacecraft. The sub-satellites have similar, but different eccentricities and orbit inclinations, depending on how far the sub-satellites are from the central host spacecraft. While this approach enables almost constant range between the sub-satellites and the central host spacecraft, the approach requires multiple station-keeping burns per orbit to maintain cluster formation against the "$J_2$" effects of Earth's gravity and other perturbing forces such as Sun-moon attractions and atmospheric drag. If the constant range restriction is relaxed, the differences in inclination may be eliminated, thus potentially reducing the station-keeping requirements. This will significantly reduce propellant usage.

Thus, an alternative approach to deploy and control sub-satellites may be beneficial.

SUMMARY

Certain embodiments of the present invention may provide solutions to the problems and needs in the art that have not yet been fully identified, appreciated, or solved by current deployment and control algorithms. For example, in some embodiments, a deployment algorithm may deploy a group of CubeSats or small satellites around a center satellite, and a control algorithm may control or navigate each CubeSat or each small satellite around the center satellite. For purposes of explanation, CubeSat(s) or small satellite(s) will be referred to as satellite(s).

In one embodiment, a process for deploying a plurality of small satellites includes computing a plurality of orbit elements for deployment of one or more companion satellites, and using the plurality of orbit elements to deploy the one or more companion satellites into a wheel cluster formation.

In another embodiment, an apparatus includes memory and at least one processor. The memory includes a set of instructions. The set of instructions with the at least one processor causes the apparatus to determine a plurality of orbit elements for deployment of one or more companion satellites, and use the plurality of orbit elements to deploy the one or more companion satellites into a wheel cluster formation.

In yet another embodiment, a process for controlling a plurality of small satellites includes determining, by at least one processor, one or more deviations in an orbit of a companion satellite, and controlling, by the at least one processor, the companion satellite to minimize effects of perturbing forces.

In yet a further embodiment, an apparatus includes memory and at least one processor. The memory includes a set of instructions. The set of instructions with the at least one processor causes the apparatus to determine one or more deviations in an orbit of a companion satellite, and control the companion satellite to minimize effects of perturbing forces.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

One or more embodiments generally pertain to an algorithm for deploying a group of satellites (or companion satellites) around a center satellite. For example, several companion satellites may be placed on slightly different orbits such that each companion satellite moves around a center satellite in a wheel shaped formation. It should be appreciated that there is no maximum or minimum number of companion satellites. However, to prevent collision, the number of companion satellites depends on the closest distance allowed between any two companion satellites and the accuracy of an onboard navigation and station keeping algorithm.

In some embodiments, a deployment algorithm may require simple maneuvers with small orbit eccentricity and argument of perigee changes. This way, closely separated orbits are in the same plane and experience very small differential perturbing forces. In certain embodiments, an optimized control algorithm may be implemented using the onboard propulsion and navigation system of the companion satellites.

Figure 1:
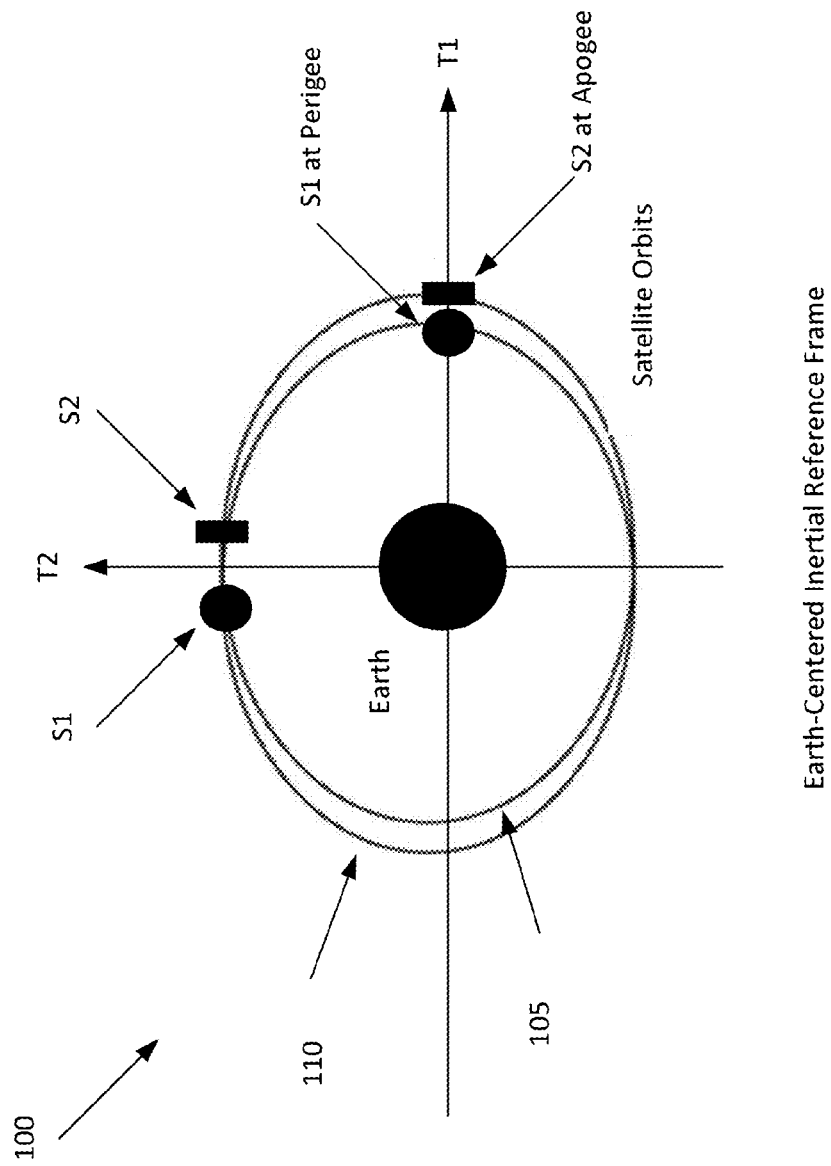
FIG. 1 illustrates a wheel formation with two satellite orbits, according to an embodiment of the present invention.

FIG. 1 illustrates a wheel formation 100 with satellite orbits 105, 110, according to an embodiment of the present invention. In one embodiment, satellite orbits 105, 110 have opposite perigee with the same semi-major axis and eccentricity. For example, wheel formation 100 of FIG. 1 includes two companion satellites S1, S2 moving on two orbits 105, 110 with identical size and shape but with 180 degrees of difference in argument of perigee. In this example, companion satellites S1, S2 at time T1 are near perigee and apogee, respectively, of their orbits 105, 110. In other words, companion satellites S1, S2 are separated by a distance proportional to a small eccentricity $\epsilon$ of the orbits 105, 110 at time T1. In some embodiments, time T1 and time T2 represent the instants when the companion satellites S1, S2 are at perigee/apogee and near 90 degrees past perigee/apogee, respectively.

Due to dynamics of the orbital motion, companion satellites S1, S2 are separated by the largest distance at time T2, which is 90 degrees from where companion satellites S1, S2 were at time T1 in the Earth-centered inertial reference frame. The separation at time T2 is twice the separation at time T1, resulting in an elliptical sub-orbit in the relative, co-rotating (or co-orbital) reference frame in FIG. 2. For example, if the separation at time T1 is 5 kilometers, then at time T2, the separation is 10 kilometers.

Figure 2:
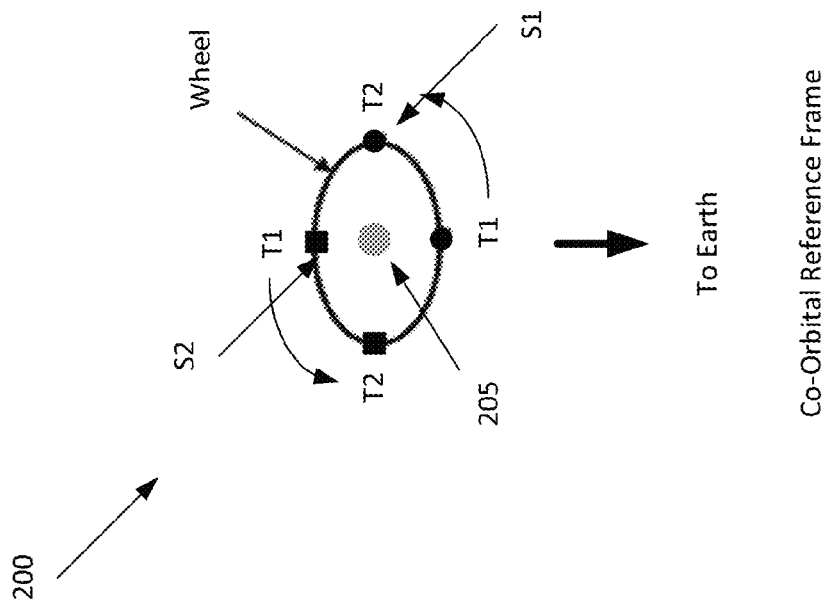
FIG. 2 illustrates a path of relative motion, according to an embodiment of the present invention.

FIG. 2 illustrates a path 200 of relative motion, according to an embodiment of the present invention. In one embodiment, the companion satellites S1, S2 achieve a formation that circulates around a sub-orbit equal to a common orbital period of companion satellites S1, S2. The wheel cluster formation in some embodiments allows multiple companion satellites S1, S2 to fly around a central (or mother) satellite 205 in the center of the wheel cluster formation. In some embodiments, this may be a virtual, or non-physical satellite.

Figure 3:
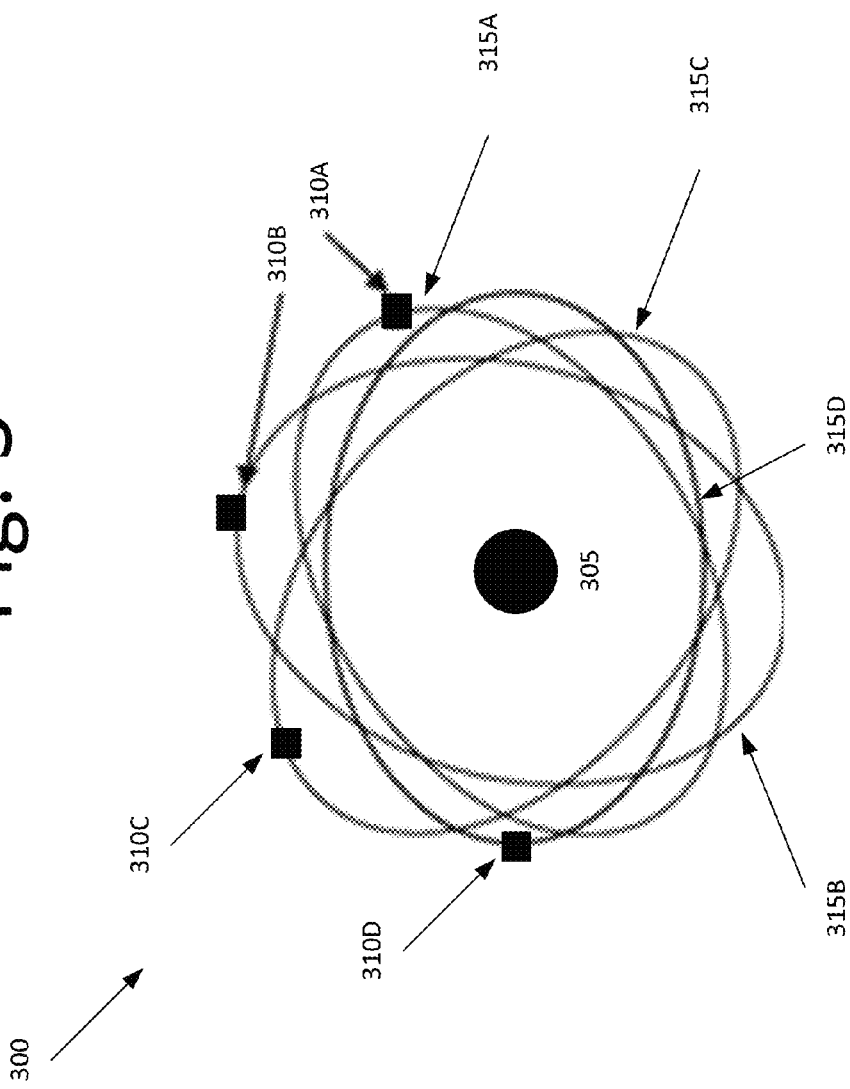
FIG. 3 illustrates a wheel cluster formation with four satellites, according to an embodiment of the present invention.

FIG. 3 illustrates a wheel cluster formation 300 with four companion satellites 310A-D, according to an embodiment of the present invention. In one embodiment, companion satellites 310A-D move along four wheel sub-orbits 315A-D, and the center (or mother) satellite 305 is the middle of wheel sub-orbits 315A-D. Center satellite 305 may move on a circular orbit or an elliptical orbit about the Earth.

Each companion satellite 310A-D may move on an orbit with a small change in eccentricity and argument of perigee. In some embodiments, each wheel sub-orbit 315A-D may be rotated by a small angle. It should be appreciated that in certain embodiments each wheel sub-orbit 315A-D is an ellipse with its long axis twice the length of the short axis. Each wheel sub-orbit 315A-D may include two companion satellites, in some embodiments.

In order to uniformly populate the companion satellites, the angle of separation between adjacent satellites with respect to center satellite or point 305 in this reference frame may be 360 degrees divided by the number of companion satellites. For example, if there are 10 companion satellites, then there would be a companion satellite every 36 degrees. This way, each companion satellite may rotate around the center satellite.

However, to deploy the companion satellites in orbit, an algorithm to compute the orbit elements of each of the companion satellites may be utilized. See, for example, FIG. 4, which is a flow diagram illustrating a process 400 for computing orbit elements for each of the satellites, according to an embodiment of the present invention. Process 400 may be executed by computing system 1000 of FIG. 10, for example. In some embodiments, process 400 begins at 405 with the computing system determining the shortest distance D between the center satellite and any of the companion satellites. Next, the computing system determines an orbit semi-major axis a, which may be common to all satellite orbits, at 410. At 415, the computing system calculates the difference in eccentricity $\Delta e$ at 415. This may be determined using the following equation:

$$\Delta e = D/a \qquad \text{Equation (1)}$$

where D is the shortest distance between a center satellite and any of the companion satellites, and a is an orbit semi-major axis, which is common to all satellite orbits. It should be appreciated that in some embodiments the length of the short axis of all the wheels in FIGS. 2 and 3 is 2D, and the length of the long axis is 4D. The size of the wheel may in certain embodiments be the key parameter in the design of a cluster formation in some embodiments. Wheel diameter may be the same as the long axis, thus setting shortest distance D, and finally, delta eccentricity $\Delta e$ using Eq. (1). For example, embodiments where the collocation of two or more geostationary (GEO) satellites is applicable, shortest distance D is small enough to ensure that the cluster of satellites stay within the required station-keeping box, typically ±0.1 degree in longitude and latitude. For low-altitude satellite clusters, shortest distance D should be less than a certain limit due to onboard antenna power constrain or minimizing differential drag effects in the atmosphere.

At 420, the computing system calculates an eccentricity of the companion satellite $e_1$ using the following equation:

$$e_1 = (e^2 + \Delta e^2 - 2e\Delta e \cos(\beta))^{1/2} \qquad \text{Equation (2)}$$

where e is the orbit eccentricity of the center satellite, $\Delta e$ is the difference in orbit eccentricity between the center satellite and the companion satellite and $\beta$ is the angular separation between two adjacent companion satellite orbit. The above relation is derived from a vector difference between eccentricity vectors, which will be defined later in the subject application. For the simple case of one or two satellites moving around the center satellite, angular separation $\beta$ is 0 or 180 degrees and $\Delta e$ is the difference in orbit eccentricity between the center satellite and one of the companion satellites.

At 425, the computing system calculates the sine of argument of perigee S. The sine of argument of perigee S may be calculated using the following equation:

$$S = (\Delta e/e_1) * \sin(\beta) \qquad \text{Equation (3)}$$

By calculating the sine of argument of perigee S, the value of the argument of perigee of the companion satellite can be determined. The above relations, Equations (2) and (3), may be critical in determining the deployment of the companion satellite in some embodiments.

At 430, the computing system calculates an argument of perigee using the following equation:

$$\omega_1 = \sin^{-1}(S) \qquad \text{Equation (4)}$$

where $\omega_1$ is the argument of perigee of the companion satellite orbit.

At 435, the computing system calculates a mean anomaly $M_1$ of the companion satellite using the following equation:

$$M_1 = 360 - \omega_1 \quad \text{Equation (5)}$$

By calculating the mean anomaly $M_1$, the location of the companion satellite can be determined, and deployed shortly thereafter.

Figure 4:
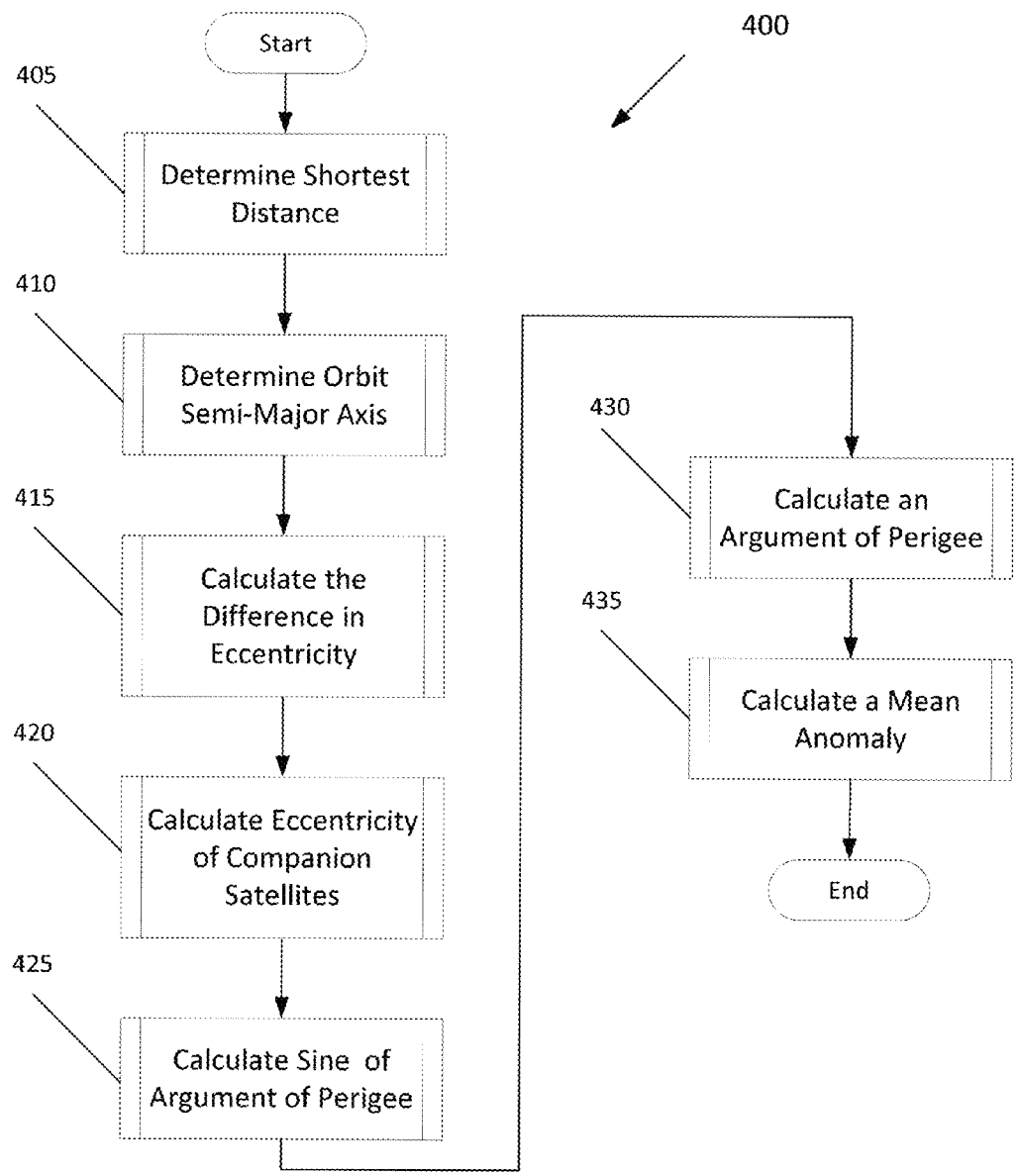
FIG. 4 is a flow diagram illustrating a process for computing orbit elements for each of the satellites, according to an embodiment of the present invention.

It should be appreciated that the above flow diagram of FIG. 4 may be used to determine the deployment location for each companion satellite. It should be further appreciated that the new orbit elements of each companion satellite may include, but is not limited to, the orbit semi-major axis a, the eccentricity of the companion satellites $e_1$, the inclination i, right ascension of ascending node $\Omega$, argument of perigee $\omega_1$, and the mean anomaly $M_1$. In some embodiments, the orbit semi-major axis a, the inclination i, and the right ascension of ascending node $\Omega$ are the same as for the orbit of the center satellite. It should be appreciated that in some embodiments the initial difference in eccentricity, argument of perigee and mean anomaly between the center satellite and the companion satellite should be maintained throughout the entire mission to keep the desired wheel cluster formation. See, for example, the control process described below with respect to FIG. 9.

Figure 5:
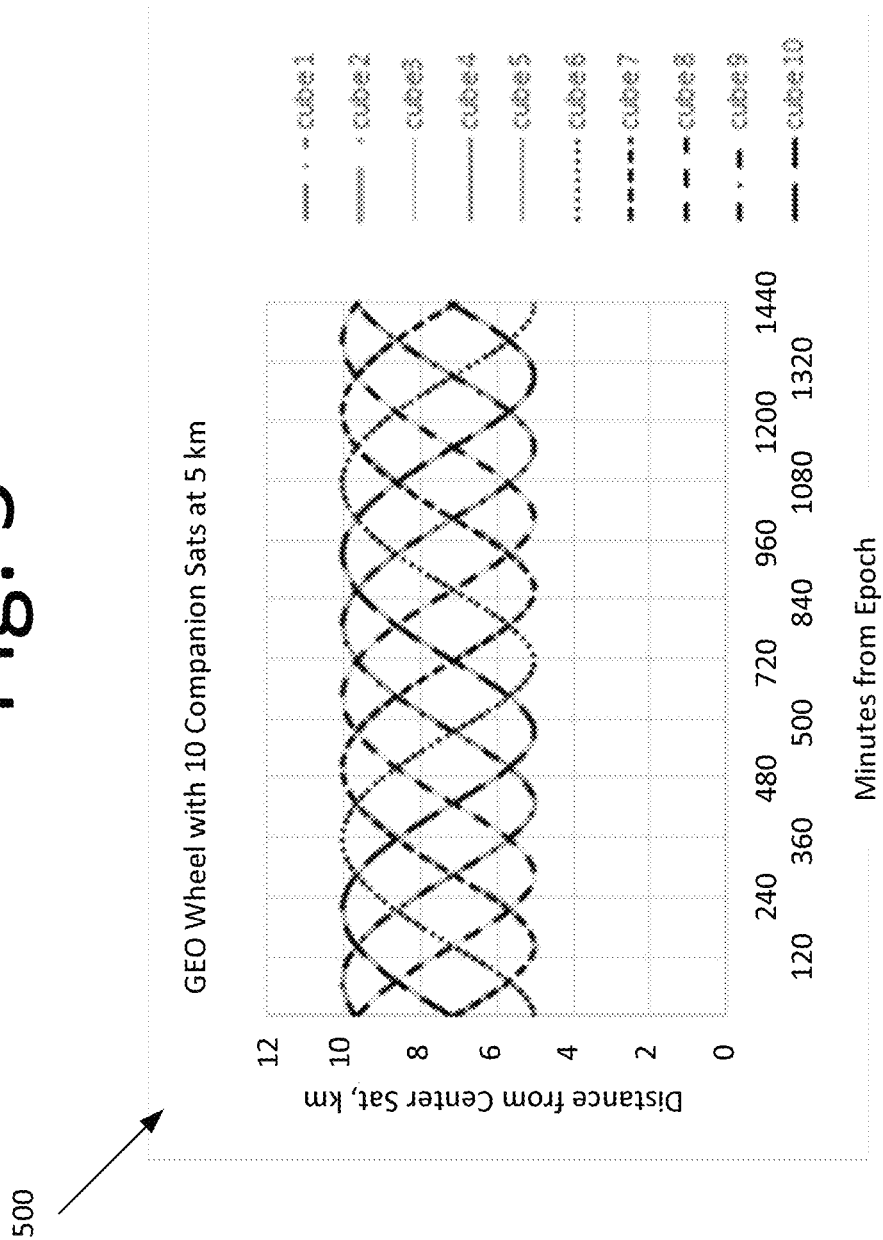
FIG. 5 is a graph illustrating a wheel cluster formation for 10 satellites, according to an embodiment of the present invention.

FIG. 5 is a graph 500 illustrating a wheel cluster formation for 10 satellites, according to an embodiment of the present invention. In this embodiment, graph 500 shows the history of the distance offset for 10 companion satellites relative to the center satellite in GEO for 24 hours (or 1440 minutes). In this example, graph 500 shows a variation between 5 kilometers and 10 kilometers following one cycle of each wheel sub-orbit.

Figure 6:
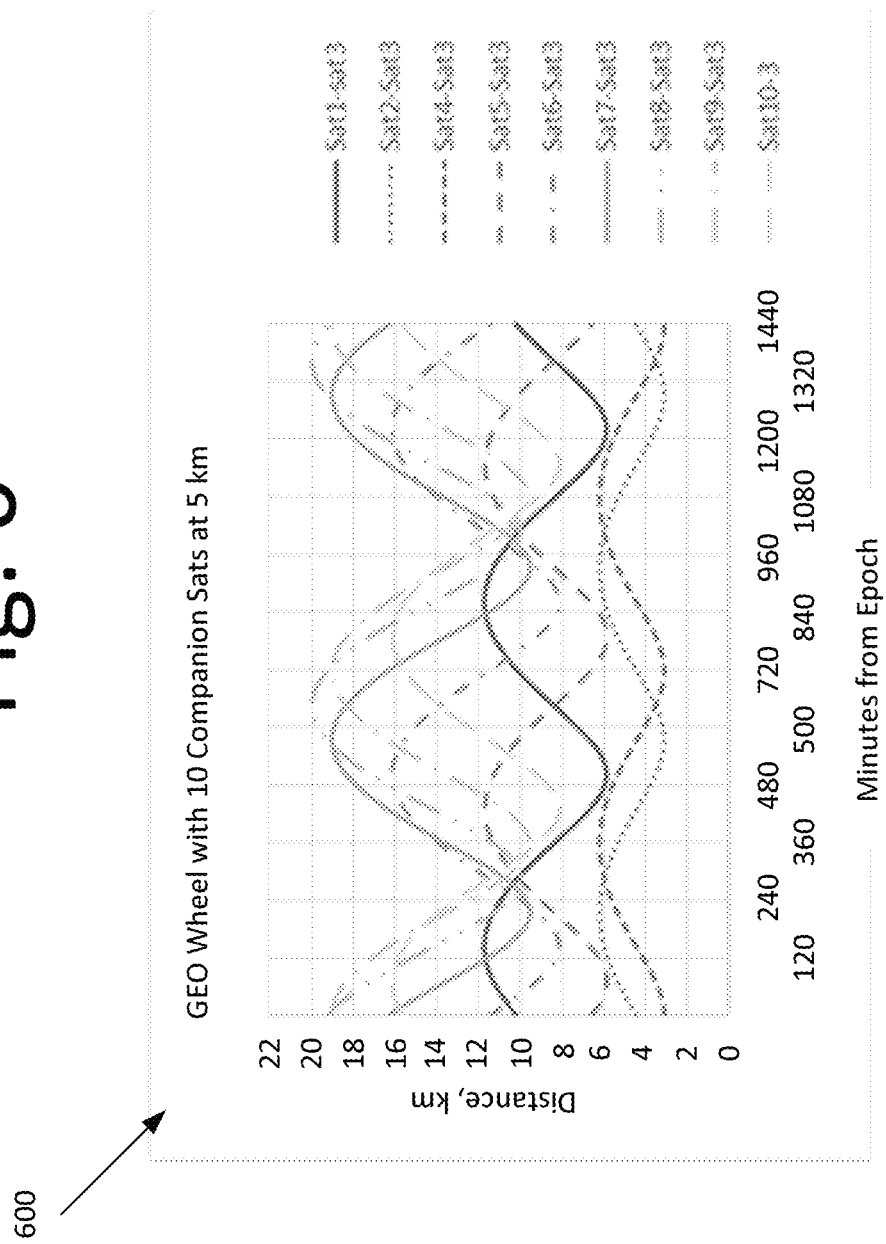
FIG. 6 is a graph illustrating a history of distances between a third satellite and other satellites, according to an embodiment of the present invention.

FIG. 6 is a graph 600 illustrating a history of distances between a third satellite and other satellites, according to an embodiment of the present invention. In this embodiment, graph 600 shows the distance history between companion satellite Sat3 and the other nine companion satellites during the same orbit period of 1440 minutes. In graph 600, the distance may be less than 5 kilometers and no greater than 20 kilometers between any two companion satellites. It should be appreciated that the above distance histories may be computed from simplified orbit relations without perturbing forces, such as Earth oblateness $J_2$ and Sun and/or Moon attractions. It should be further appreciated that this pattern of relative distance variation repeats for every orbital period. For example, each sub-orbit may include two companion satellites separated by 180 degrees, and therefore, the paths of relative distance for the two companion satellites may coincide. It should be appreciated that in order to satisfy the sun-pointing strategy for GEO collocation applications, each sub-orbit may only contain one companion satellite and the $\beta$ angle should be kept small in some embodiments. However, this constraint can be removed when the area-to-mass ratio of the companion satellites is small, e.g., less than 0.01 $m^2$/kg, when the solar-radiation induced eccentricity variation becomes insignificant.

Figure 7:
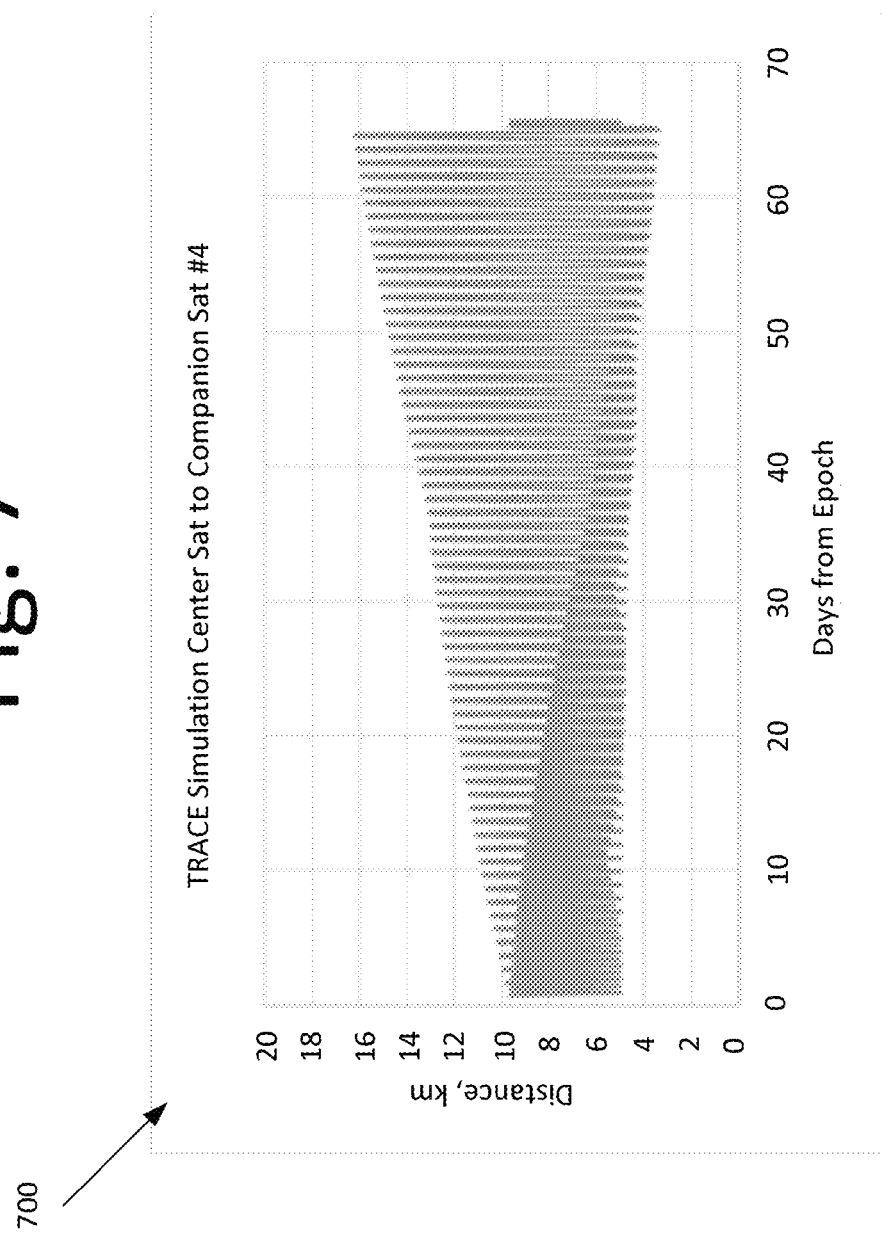
FIG. 7 is a graph illustrating a distance history between a center satellite and a fourth satellite under all perturbing forces, according to an embodiment of the present invention.
Figure 8:
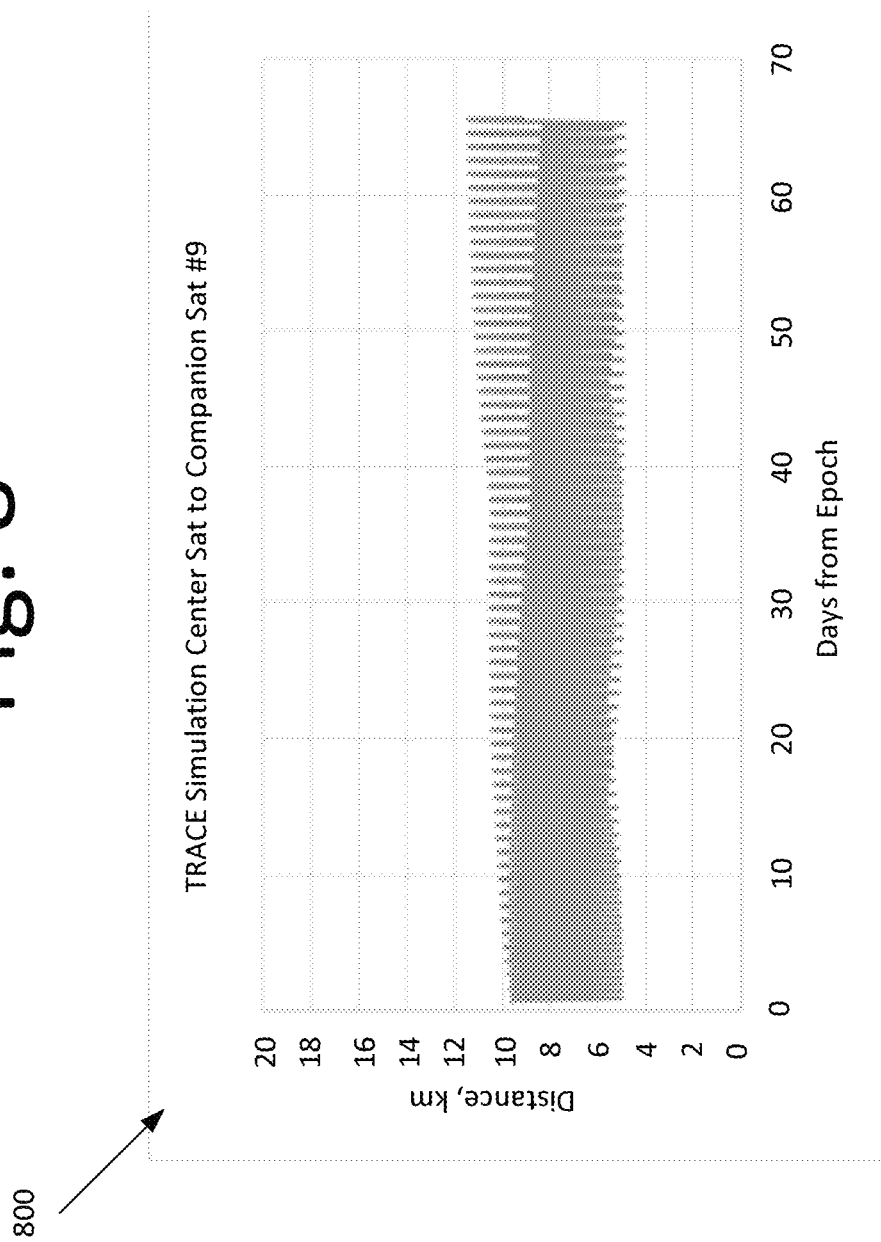
FIG. 8 is a graph illustrating a distance history between a center satellite and a ninth satellite under all perturbing forces, according to an embodiment of the present invention.

FIG. 7 is a graph 700 illustrating a distance history between a center satellite and a fourth satellite under simulated perturbing forces, according to an embodiment of the present invention. FIG. 8 is a graph 800 illustrating a distance history between a center satellite and a ninth satellite under simulated perturbing forces, according to an embodiment of the present invention. In graphs 700 and 800, the gradual increase in the distance between the fourth companion satellite (see FIG. 7) and the ninth companion satellite (see FIG. 8) reflects the effects from perturbing forces. In graph 700, for example, the effects of perturbing forces are more apparent. The slow deviations from the ideal formation suggest that proper orbit control or maneuvers are needed for each companion satellite after a predefined period of time.

Figure 9:
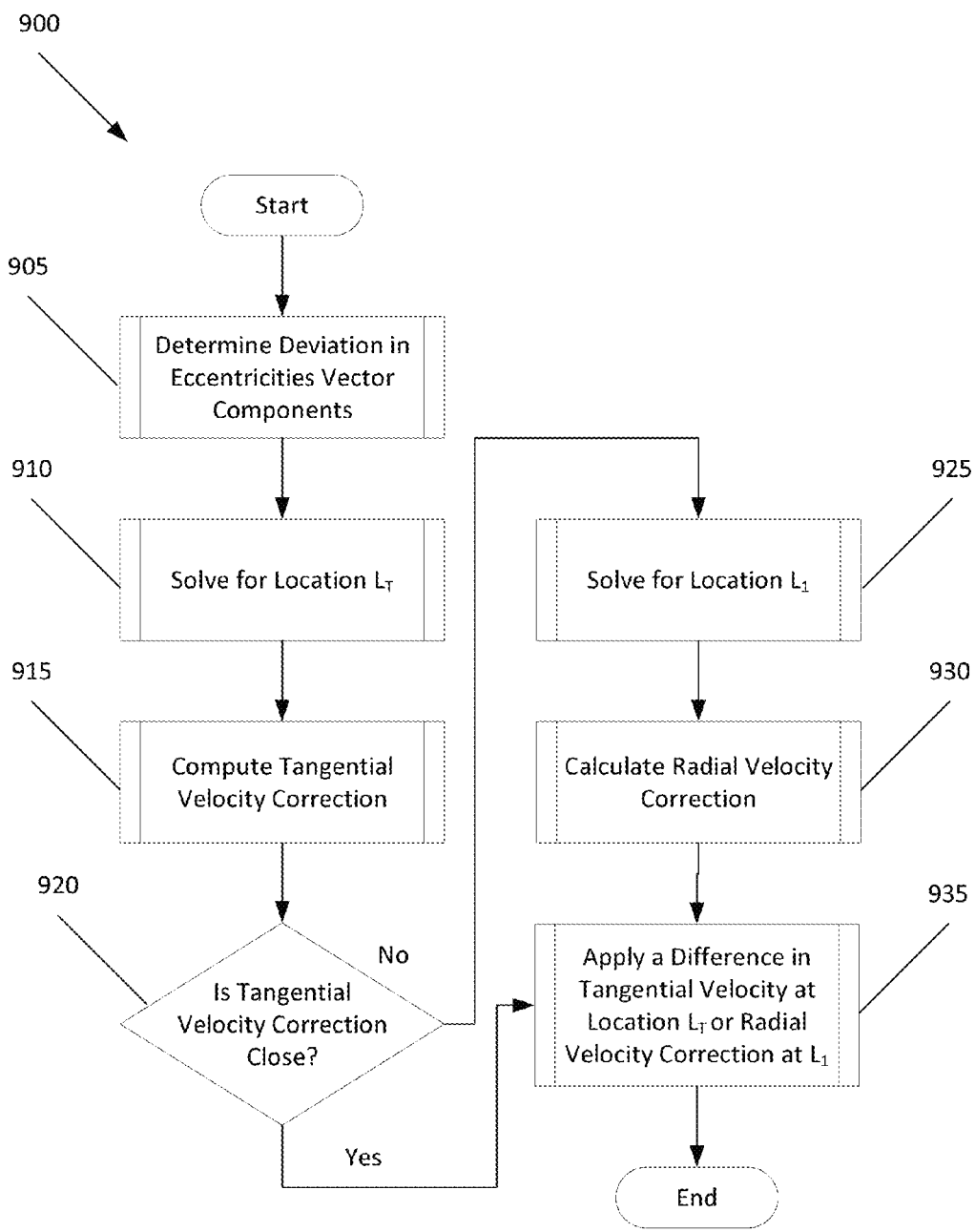
FIG. 9 is a flow diagram illustrating a process for correcting deviations in eccentricity and argument of perigee of a satellite's orbit, according to an embodiment of the present invention.

FIG. 9 is a flow diagram illustrating a process 900 for correcting deviations in eccentricity and argument of perigee of a companion satellite's orbit, according to an embodiment of the present invention. In other words, process 900 is a control algorithm that adjusts or maneuvers the companion satellite after a predefined period of time to minimize the effects of perturbing forces. This time period may be 10 days, one month, or any period of time depending on the system requirements. Larger acceptable deviations from the ideal case enable longer periods of time between station-keeping adjustments. For example, after 10 days, the control algorithm may apply a difference in orbit velocity $\Delta V$ to maneuver the companion satellite along the wheel cluster formation. In some embodiments, equations for determining the magnitude and location of the difference in orbit velocity $\Delta V$ may be used to correct deviations in eccentricity and argument of perigee for the companion satellite orbit. These equations relate to the difference in orbit velocity $\Delta V$ along the orbit tangential direction to the resulting changes in the component of an eccentricity vector.

Figure 10:
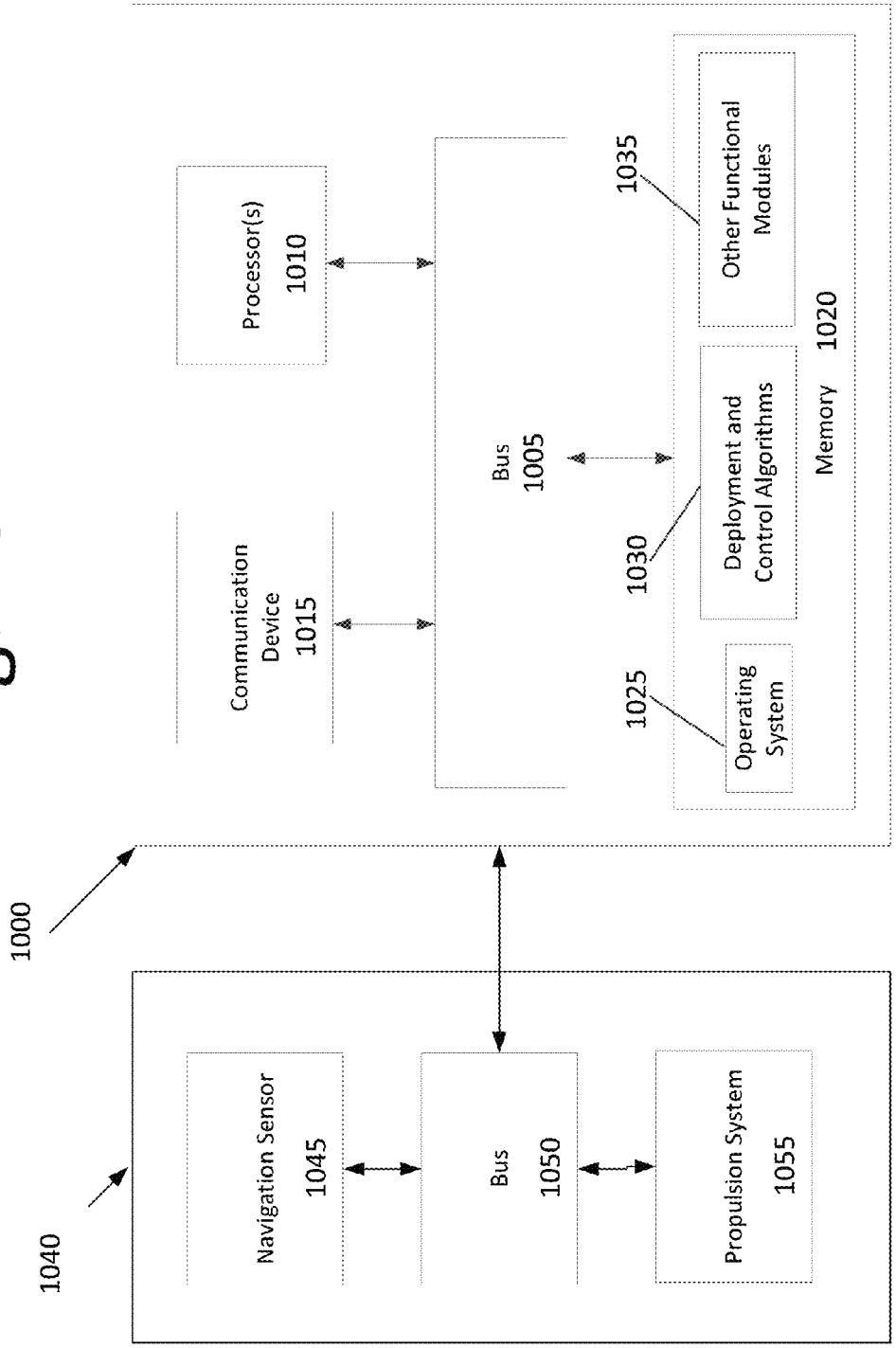
FIG. 10 is a block diagram illustrating a computing system for deployment and control of a satellite, according to one embodiment of the present invention.

It should be noted that process 900 may be executed by computing system 1000 of FIG. 10, for example. In some embodiments, eccentricities vectors $e_s$ and $e_c$ and location L are non-singular elements, and may be defined as $$e_c = e \cos(\omega + \Omega) \quad \text{Equation (6)}$$

$$e_s = e \sin(\omega + \Omega) \quad \text{Equation (7)}$$

$$L = \omega + \Omega + M \quad \text{Equation (8)}$$

In some embodiments, the process may begin with the computing system (on board the small satellite) determining the difference in deviation in eccentricities vectors $e_s$ and $e_c$ at 905. The following equations may compute small deviations of the eccentricity vector of the companion satellite caused by the difference in perturbing forces between the center satellite and the companion satellite:

$$\Delta e_c = \Delta e_{cT} - \Delta e_{c0} \quad \text{Equation (9)}$$

$$\Delta e_s = \Delta e_{sT} - \Delta e_{s0} \quad \text{Equation (10)}$$

where $\Delta e_{cT}$ and $\Delta e_{sT}$ are the differences between the center satellite and the companion satellite at the time of station-keeping, while $\Delta e_{c0}$ and $\Delta e_{s0}$ are the desired difference at deployment. Once the two quantities, $\Delta e_{cT}$ and $\Delta e_{sT}$, are determined from an onboard navigation system (see FIG. 10), the station-keeping orbit velocity $\Delta V$ and the location of the maneuver can be accomplished using the following equations $$\Delta e_c = (2 \cos L_T) \Delta V / V \quad \text{Equation (11)}$$

$$\Delta e_s = (2 \sin L_T) \Delta V / V \quad \text{Equation (12)}$$

In some embodiments, V is the orbit velocity of the companion satellite at location $L_T$, i.e. the location where the small satellite should be maneuvered in a tangential velocity $\Delta V$. Next, at 910, the computing system solves for location $L_T$ for applying the tangential velocity $\Delta V$, using the following equation $$L_T = \tan^{-1}[\Delta e_s / \Delta e_c] \quad \text{Equation (13)}$$

At 915, the computing system computes tangential velocity correction ΔV using either Equations (11) or (12). It should be appreciated that when the center satellite is a GEO satellite, the periodic longitude station-keeping maneuvers may be combined with the above maneuvers for the small satellite if the magnitudes of the two types of tangential velocities ΔV are close to each other. Depending on the embodiment, the longitude station-keeping maneuvers are normally applied at either perigee or apogee of a GEO satellite.

If the computing system determines that tangential velocities are close to each other at 920, then the process continues to 935, and the computing system applies difference in the tangential velocity at location $L_T$. If, however, the computing system determines that the tangential velocities are not close to each other at 920, additional maneuver with the remaining amount of tangential velocity ΔV along a radial direction at a different location $L_1$ may be required. In this case, at 925, the computing system may determine (or solve) for the different location $L_1$ with the following equation $$L_1 = \tan^{-1}[-\Delta e_c / \Delta e_s] \quad \text{Equation (14)}$$

In some embodiments, different location $L_1$ is for a different $\Delta V_1$ along a radial vector, i.e. the direction of a position vector from the center of Earth to the small satellite. Next, at 930, the computing system may calculate a different radial velocity correction $\Delta V_1$ which may be computed using the following equation $$\Delta V_1 = V[\Delta e_c \sin L_1 - \Delta e_s \cos L_1] \quad \text{Equation (15)}$$

It should be appreciated that the above Equations (14) and (15) are used when there are no longitude station-keeping or drag makeup maneuvers. In some embodiments, the frequency of maneuvers may depend on the perturbing force difference, the tolerance of minimum separation distance and the propulsion system of the companion satellite. At 935, once the tangential velocity correction ΔV is calculated, the computing system may apply the difference in the tangential velocity at location $L_T$ or apply a radial velocity correction at $L_1$ in order to maneuver the companion satellite back to its proper orbit.

In some embodiments, this station-keeping (or control) process may be applied to impulsive maneuvers with near circular orbits, where e less than 0.1. For electrical propulsion systems, such as pulsed plasma thruster, the control process may be extended to finite burns with durations depending on the ΔV magnitude and specific impulse value $I_{SP}$. For example, specific impulse $I_{SP}$ is the thrust divided by the mass flow rate into the thruster in an embodiment. Chemical thrusters may have a specific impulse value $I_{SP}$ ranging from 200 to 450 seconds, while electric thrusters have a specific impulse value $I_{SP}$ range from 300 to 10,000 seconds. Electric thrusters are far more propellant efficient than chemical thrusters, but are typically low-thrust devices that need to fire longer to produce a given ΔV. For orbits with large eccentricity, such as Molniya and Tundra orbits, a two-burn argument of perigee control process with finite burns may be implemented.

FIG. 10 is a block diagram illustrating a computing system 1000 for deployment and control of a satellite, according to one embodiment of the present invention. Computing system 1000 may include a bus 1005 or other communication mechanism configured to communicate information, and at least one processor 1010, coupled to bus 1005, configured to process information. At least one processor 1010 can be any type of general or specific purpose processor. Computing system 1000 may also include memory 1020 configured to store information and instructions to be executed by at least one processor 1010. Memory 1020 can be comprised of any combination of random access memory ("RAM"), read only memory ("ROM"), static storage such as a magnetic or optical disk, or any other type of computer readable medium. Computing system 1000 may also include a communication device 1015, such as a network interface card, configured to provide access to a network.

The computer readable medium may be any available media that can be accessed by at least one processor 1010. The computer readable medium may include both volatile and nonvolatile medium, removable and non-removable media, and communication media. The communication media may include computer readable instructions, data structures, program modules, or other data and may include any information delivery media.

According to some embodiments, memory 1020 may store software modules that may provide functionality when executed by at least one processor 1010. The modules can include an operating system 1025 and deployment and control algorithms 1030 for deploying satellites and controlling the satellites immediately or sometime thereafter, as well as other functional modules 1035. Operating system 1025 may provide operating system functionality for computing system 1000. Because computing system 1000 may be part of a larger system, computing system 1000 may include one or more additional functional modules 1035 to include the additional functionality.

Computing system 1000 may communicate with an onboard navigation system 1040 via bus 1050. Onboard navigation system 1040 may include an onboard navigation sensor 1045 that determines the relative position and velocity of each companion satellite with respect to the center satellite. Onboard navigation sensor 1045 may include, but is not limited to, global position system (GPS) receiver, a differential GPS receiver, pathfinder, or other sensors that would be appreciated by a person of ordinary skill in the art. Onboard navigation system 1040 may also include onboard propulsion system 1055, which may include chemical or electric thrusters along radial and tangential directions.

One skilled in the art will appreciate that a "system" could be embodied as a computing system on a satellite, a computing system at a ground station, a server, a console, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process shown in FIGS. 4 and 9 may be performed, in part, by a computer program, encoding instructions for a nonlinear adaptive processor to cause at least the process described in FIGS. 4 and 9 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the process described in FIGS. 4 and 9, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Depending on the embodiment, the process shown in FIGS. 4 and 9 may be executed by a center satellite, one or more companion satellites, and/or ground station.

In some embodiments, an algorithm may populate a group of satellites around a center satellite together with a control algorithm to keep the satellites in close formation. The concept of using small eccentricity vector separation to place the satellites on multiple wheel shape sub-orbits gives desirable relative motion to the center satellite with safe separation distance among all the companion satellites. All of the companion satellites' orbits are in the same orbit plane of the center satellite with a common period. This way, the cluster formation can be controlled by simplified station-keeping strategies with reduced fuel requirement. This generalized wheel cluster formation may be applied at different orbits, such as low Earth Orbit (LEO), medium Earth orbit (MEO), geostationary orbit (GEO), and highly elliptical orbit (HEO), at various altitudes, as well as, artificial satellite orbits around other planets.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A process, comprising:
computing a plurality of orbit elements for deployment of one or more companion satellites, wherein the computing of the plurality of orbit elements begins with computing

$$\Delta e = \frac{D}{a},$$

where $\Delta e$ is difference in eccentricity, D is shortest distance between a center satellite and any of the one or more companion satellites, a is an orbit semi-major axis, the orbit semi-major axis is common to all satellite orbits; and using the plurality of orbit elements to deploy the one or more companion satellites into a wheel cluster formation.

2. The process of claim 1, wherein each of the one or more companion satellites comprises a corresponding set of orbit elements, wherein the set of orbit elements comprises the orbit semi-major axis, eccentricity, inclination, right ascension of an ascending node, argument of perigee, and a mean anomaly.

3. The process of claim 1, wherein the computing of the plurality of orbit elements comprises calculating an eccentricity of the one or more companion satellites.

4. The process of claim 1, wherein the computing of the plurality of orbit elements comprises calculating a sine of argument of perigee of the one or more companion satellites.

5. The process of claim 1, wherein the computing of the plurality of orbit elements comprises calculating an argument of perigee of an orbit of the one or more companion satellites.

6. The process of claim 1, wherein the computing of the plurality of orbit elements comprises calculating a mean anomaly to determine a location of the one or more companion satellites for deployment into the wheel cluster formation.

7. An apparatus, comprising:

memory comprising a set of instructions; and at least one process, wherein the set of instructions with the at least one processor causes the apparatus to determine a plurality of orbit elements for deployment of one or more companion satellites, wherein the determining of the plurality of orbit elements begins with computing $$\Delta e = \frac{D}{a},$$

where $\Delta e$ is difference in eccentricity, D is shortest distance between a center satellite and any of the one or more companion satellites, a is an orbit semi-major axis, the orbit semi-major axis is common to all satellite orbits; and use the plurality of orbit elements to deploy the one or more companion satellites into a wheel cluster formation.

8. The apparatus of claim 7, wherein each of the one or more companion satellites comprises a corresponding set of orbit elements, wherein the set of orbit elements comprises the orbit semi-major axis, eccentricity, inclination, right ascension of an ascending node, argument of perigee, and a mean anomaly.

9. The apparatus of claim 7, wherein the set of instructions with the at least one processor causes the apparatus to calculate an eccentricity of the one or more companion satellites.

10. The apparatus of claim 7, wherein the set of instructions with the at least one processor causes the apparatus to calculate a sine of argument of perigee of the one or more companion satellites.

11. The apparatus of claim 7, wherein the set of instructions with the at least one processor causes the apparatus to calculate an argument of perigee of an orbit of the one or more companion satellites.

12. The apparatus of claim 7, wherein the set of instructions with the at least one processor causes the apparatus to calculate a mean anomaly to determine a location of the one or more companion satellites for deployment into the wheel cluster formation.

* * * * *